US012040853B1

United States Patent
Anderson et al.

(10) Patent No.: US 12,040,853 B1
(45) Date of Patent: Jul. 16, 2024

(54) METHOD AND SYSTEM FOR A MULTI-FREQUENCY RAIL CAR ANTENNA ARRAY

(71) Applicant: CSC Holdings, LLC, Bethpage, NY (US)

(72) Inventors: Robert Anderson, Levittown, NY (US); Andrew Ip, Bethpage, NY (US); Mike Alexander, W. Hempstead, NY (US)

(73) Assignee: CSC Holdings, LLC, Bethpage, NY (US)

( * ) Notice: Subject to any disclaimer, the term of this patent is extended or adjusted under 35 U.S.C. 154(b) by 238 days.

(21) Appl. No.: 16/393,321

(22) Filed: Apr. 24, 2019

Related U.S. Application Data

(63) Continuation of application No. 14/825,594, filed on Aug. 13, 2015, now Pat. No. 10,277,288.

(Continued)

(51) Int. Cl.
  *H04B 7/0413* (2017.01)
  *G01S 19/01* (2010.01)
  *H01Q 1/32* (2006.01)
  *H01Q 1/42* (2006.01)
  *H01Q 21/30* (2006.01)
  (Continued)

(52) U.S. Cl.
  CPC ............ *H04B 7/0413* (2013.01); *G01S 19/01* (2013.01); *H01Q 1/3275* (2013.01); *H01Q 1/42* (2013.01); *H01Q 21/30* (2013.01); *H04W 76/16* (2018.02); *H04W 84/042* (2013.01); *H04W 84/12* (2013.01)

(58) Field of Classification Search
  CPC ...................................................... H04B 7/043
  See application file for complete search history.

(56) References Cited

U.S. PATENT DOCUMENTS 7,642,988 B1 * 1/2010 Johnson ................ H01Q 21/28
343/878
2001/0044681 A1   11/2001 Diana et al.
(Continued)

OTHER PUBLICATIONS

Fraaz Kamal, "Using 5.9 GHz DSRC to Aid the Elderly in Vehicular Environments", Spring 2013, University of Alberta, pp. 1-100 (Year: 2013).*

(Continued)

*Primary Examiner* — Walter J Divito
*Assistant Examiner* — Camquyen Thai
(74) *Attorney, Agent, or Firm* — Sterne, Kessler, Goldstein & Fox P.L.L.C.

(57) ABSTRACT

The present invention relates to methods and systems utilizing a multiple-frequency antenna array system. The multiple-frequency antenna array system includes a first set of broadband elements that allows the establishment of a first cellular data communication session and a concurrent second cellular data communication session. The system also includes a second set of broadband elements that allow the establishment of a first local area wireless network communication session and a concurrent second local area wireless network communication session. Further, there is a broadband element configured to receive a global positioning signal. In addition, the multiple-frequency antenna array system is coupled to a vehicle. A method for establishing multi-frequency communication sessions using an antenna array is also presented.

23 Claims, 11 Drawing Sheets

Related U.S. Application Data

(60) Provisional application No. 62/037,999, filed on Aug. 15, 2014.

(51) Int. Cl.
*H04W 76/16* (2018.01)
*H04W 84/04* (2009.01)
*H04W 84/12* (2009.01)

(56) References Cited

U.S. PATENT DOCUMENTS

| | | |
|---|---|---|
| 2002/0102987 A1 | 8/2002 | Souisse et al. |
| 2004/0259597 A1* | 12/2004 | Gothard ............... H01Q 1/246 |
| | | 455/562.1 |
| 2005/0259619 A1 | 11/2005 | Boettle et al. |
| 2006/0109192 A1 | 5/2006 | Weigand |
| 2007/0064830 A1* | 3/2007 | Choi ................... H04B 7/0634 |
| | | 375/267 |
| 2007/0279304 A1 | 12/2007 | Chakam et al. |
| 2008/0026697 A1 | 1/2008 | Signell et al. |
| 2008/0027636 A1* | 1/2008 | Tengler ............ G08G 1/096811 |
| | | 701/425 |
| 2009/0129367 A1* | 5/2009 | Bitran ............... H04W 72/1257 |
| | | 370/350 |
| 2009/0153407 A1* | 6/2009 | Zhang ..................... H01Q 1/52 |
| | | 343/702 |
| 2009/0267828 A1 | 10/2009 | Kobayashi et al. |
| 2010/0023845 A1* | 1/2010 | Cheng ................ H03M 13/095 |
| | | 714/790 |
| 2010/0153001 A1 | 6/2010 | Bauchot et al. |
| 2010/0245205 A1* | 9/2010 | Tran ..................... H01Q 1/2266 |
| | | 343/861 |
| 2010/0289714 A1* | 11/2010 | Peng ........................ H01Q 1/38 |
| | | 343/770 |
| 2011/0250928 A1* | 10/2011 | Schlub .................. H01Q 1/243 |
| | | 455/550.1 |
| 2012/0009983 A1* | 1/2012 | Mow ..................... H01Q 7/005 |
| | | 455/575.7 |
| 2012/0136515 A1 | 5/2012 | Noffsinger et al. |
| 2013/0095760 A1* | 4/2013 | Thota ..................... H04B 15/00 |
| | | 455/41.2 |
| 2013/0128832 A1* | 5/2013 | Kang .................. H04W 72/042 |
| | | 370/329 |
| 2013/0187820 A1 | 7/2013 | Ng et al. |
| 2013/0328723 A1* | 12/2013 | Rappaport ............. H01Q 1/243 |
| | | 342/372 |
| 2013/0336242 A1 | 12/2013 | Rajagopal et al. |
| 2014/0011452 A1* | 1/2014 | Ji ........................... H04B 5/0056 |
| | | 455/41.1 |
| 2014/0139379 A1* | 5/2014 | Bolin ..................... H01Q 1/243 |
| | | 343/702 |
| 2014/0145890 A1 | 5/2014 | Ramberg et al. |
| 2014/0156135 A1 | 6/2014 | Maki et al. |
| 2014/0180499 A1 | 6/2014 | Cooper et al. |
| 2015/0017978 A1* | 1/2015 | Hong ..................... H04B 1/006 |
| | | 455/426.1 |
| 2015/0071137 A1* | 3/2015 | Thiam ................. H01Q 9/0407 |
| | | 370/297 |
| 2015/0085650 A1* | 3/2015 | Cui ........................ H04W 92/02 |
| | | 370/230 |
| 2015/0147984 A1* | 5/2015 | Ying ........................ H01Q 5/35 |
| | | 455/90.3 |
| 2015/0223243 A1* | 8/2015 | Tabet .................. H04W 28/085 |
| | | 370/330 |
| 2015/0244061 A1* | 8/2015 | Galeev ..................... H01Q 1/50 |
| | | 343/702 |
| 2015/0270619 A1* | 9/2015 | Zhu .......................... G01V 3/00 |
| | | 343/702 |
| 2015/0288061 A1* | 10/2015 | Liu ......................... H01Q 1/48 |
| | | 343/841 |
| 2016/0104932 A1* | 4/2016 | Aminzadeh ......... H01Q 1/3275 |
| | | 343/872 |

OTHER PUBLICATIONS

ETSI, *LTE; Evolved Universal Terrestrial Radio Access (E-UTRA); Physical layer procedures* (3GPP TS 36.213 version 9.3.0 Release 9), Technical Specification, pp. 1-81, Oct. 2010.

IEEE Computer Society, *IEEE Standard for Information technology Telecommunications and information exchange between systems—Local and metropolitan area networks—Specific requirements, Part 11: Wireless LAN Medium Access Control (MAC) and Physical Layer PHY)* Specifications, Amendment 5: Enhancements for Higher Throughput, pp. 1-502, Oct. 20, 2009.

Siemens, "Electrical Components for The Railway Industry", Siemens AG, p. 1-17, 2012.

Anderson, R. et al., U.S. Appl. No. 14/825,594, entitled "Method and System for a Multi-Frequency Rail Car Antenna Array," filed Aug. 13, 2015.

* cited by examiner (Existing Technology)

METHOD AND SYSTEM FOR A MULTI-FREQUENCY RAIL CAR ANTENNA ARRAY

CROSS-REFERENCE TO RELATED APPLICATIONS

This application is a continuation of U.S. patent application Ser. No. 14/825,594, filed Aug. 13, 2015, now U.S. Pat. No. 10,277,288, which claims the benefit of U.S. Provisional Patent Application No. 62/037,999, filed Aug. 15, 2014, each of which is incorporated by reference herein in its entirety.

BACKGROUND

Field of the Invention

Embodiments of the present invention relate to antenna arrays and communication control systems.

Related Art

An antenna array refers to a group of antenna elements for radio transmission or reception. An antenna array can be used as a phased array to produce an electronically steerable directional antenna. An antenna array can also be used for radio communication on multiple frequencies. For example, in Amateur Radio an operator may use a single antenna array consisting of elements tuned for communications in the 80 Meter, 40 Meter, 30 Meter, 20 Meter, 15 Meter and 10 Meter bands.

Antenna arrays are also used to provide wireless mobile communication services. A cellular smart phone typically includes multiple antennas as the cellular carriers require operation on multiple bands. In addition, most smart phones have Global Positioning System (GPS) capabilities, and therefore require an antenna tuned to the GPS satellite frequencies, e.g., 1.57542 GHz and 1.2276 GHz. Compounding the issue is the additional demand for wireless mobile communications through the use of Wi-Fi where users can use their smart phone, laptop, or tablet to access the Internet.

The demand for wireless connectivity by users is not limited to the home, or the coffee shop. Users now look for internet connectivity while travelling, be that in a car, bus or train. Mobile connectivity while moving presents a challenge for a number of reasons. Different cellular providers have different coverage areas and different data and voice plans. Thus, one provider may be the best overall source for connectivity on one leg of a journey and another carrier could be the best choice on a different leg of that same journey. Also, there may be cost differences between the providers, or if a free Wi-Fi signal is available, the Wi-Fi connection could be the best solution.

Wireless connectivity on a vehicle also presents a number of obstacles from a mechanical, aesthetical, and electrical standpoint. Vehicles, such as a train, cannot accommodate large antennas protruding from the top of a railcar. Retrofit installation of an antenna requires minimal re-fabrication to a railcar, and the electronic/antenna design requirements must comply with railway environmental restrictions.

BRIEF SUMMARY

Disclosed herein is a method and system for a multiple-frequency antenna array located on a vehicle for data communications using both cellular and local area wireless networks that also includes GPS reception. In an embodiment, there is provided a multiple-frequency antenna array system that includes a first set of broadband elements that allows the establishment of a first cellular data communication session and a concurrent second cellular data communication session. The system also includes a second set of broadband elements that allow the establishment of a first local area wireless network communication session and a concurrent second local area wireless network communication session. Further, there is also a broadband element configured to receive a global positioning signal. In addition, the multiple-frequency antenna array system is coupled to a vehicle.

In another embodiment, there is provided a method of multiple-frequency communication that includes establishing a first cellular data communication session and a concurrent second cellular data communication session utilizing a plurality of first broadband elements in a multiple-frequency antenna array. The method also includes establishing a first local area wireless network communication session and a concurrent second local area wireless network communication session utilizing a plurality of second broadband elements in the multiple-frequency antenna array and also receiving a global positioning signal utilizing a broadband element in the multiple-frequency antenna array, where the multiple-frequency antenna array is coupled to a vehicle.

In a further embodiment there is provided a method of multiple-frequency communication that includes establishing a first cellular data communication session and a concurrent second cellular data communication session utilizing a plurality of first broadband elements in a multiple-frequency antenna array. The method also includes receiving a global positioning signal utilizing a broadband element in the multiple-frequency antenna array; wherein the multiple-frequency antenna array is coupled to a vehicle.

Further embodiments and features, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments will now be described, by way of example only, with reference to the accompanying drawings in which corresponding reference symbols indicate corresponding parts. Further, the accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
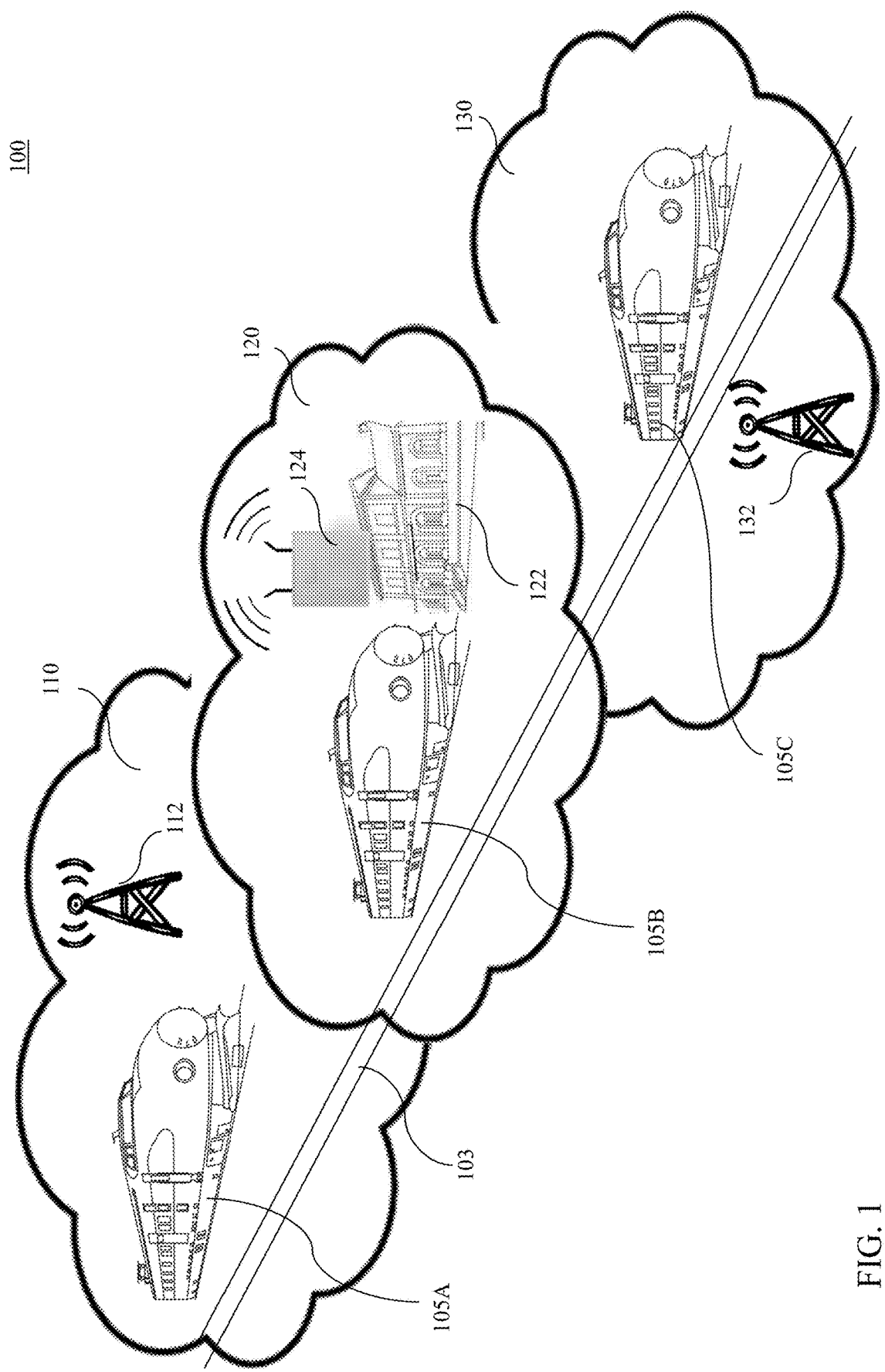
FIG. 1 illustrates a system and method of switching between communication clouds utilizing a cellular data connection and a local area wireless network, according to an embodiment of the present invention.

The features of various embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

The embodiments described herein are referred to in the specification as "one embodiment," "an embodiment," "an example embodiment," etc. These references indicate that the embodiment(s) described can include a particular feature, structure, or characteristic, but every embodiment does not necessarily include every described feature, structure, or characteristic. Further, when a particular feature, structure, or characteristic is described in connection with an embodiment, it is understood that it is within the knowledge of one skilled in the art to affect such feature, structure, or characteristic in connection with other embodiments whether or not explicitly described.

FIG. 1 illustrates a possible scenario 100 in which a vehicle, e.g., train 105, would travel through areas in which multiple types and/or providers of wireless data communication systems are available, according to an embodiment. Specifically, FIG. 1 shows train 105 in three different communication scenarios. First, train 105A is traveling on track 103 and is within the area covered by communication cloud 110. In this example, communication cloud 110 is provided by cellular tower 112 that is provided by cellular provider "A." In reality, rather than a single tower it is very likely that there are multiple cellular towers operated by the same provider, or by a multiple providers. However, each cellular provider has their own set of allotted frequencies to handle cellular communications. As such, the appropriate antenna for cellular provider "A" may be different from the appropriate antenna to support communications from provider "B." Thus, if train 105 desired to utilize multiple cellular providers, then multiple antennas would be required. For example, in support of 3G data communications AT&T uses the 850 MHz band, but Sprint and T-Mobile do not. Sprint uses the 1900 MHz band and T-Mobile uses the 1900 MHz band, 1700 MHz, and 2100 MHz bands. Therefore, if train 105 desired to utilize AT&T, Sprint, and T-Mobile as cellular providers for 3G data communications, train 105 would have to be equipped with antennas that support the 850 MHz, 1700 MHz, 1900 MHz and 2100 MHz bands. Further, if train 105 desired to communicate with multiple cellular carriers concurrently, train 105 would have to be equipped with a separate antenna for each carrier.

As train 105B moves into communication cloud 120, shown as train 105b, rather than a cellular tower, communication cloud 120 consists of a local area wireless network from access point 124, in an embodiment. While cloud 120 is depicted as containing single access point 124, in reality cloud 120 could consist of multiple access points, repeaters, wireless routers, wireless modems, etc., as would be known by one of ordinary skill in the art to provide a local area wireless network over a given area.

In an embodiment, access point 124 could be provided in train station 122, or access point 124 could be mounted externally from train station 122, but situated to provide wireless communication access for train 105B. The local area wireless network could be a Wi-Fi network and could be compliant with the various versions of IEEE 802.11, e.g., IEEE 802.11a, IEEE 802.11b, IEEE 801.11g, IEEE 802.11n, and IEEE 802.11ac. Further, the local area wireless network could use both the 2.4 GHz and 5 GHz bands in a dualband manner, as is known by one of ordinary skill in the art. To support communications over the local area wireless network, train 105B, would have to be equipped with antenna that supports local are wireless communications over either the 2.4 GHz band or over the 5 GHz band, or over both bands in a dualband manner. As with the above discussion regarding multiple cellular communication carriers, access to multiple local area wireless networks concurrently is also possible. Such multiple concurrent accesses would therefore require multiple local area wireless network antennas.

Train 105C is shown as having left communication cloud 120 and entered communication cloud 130. Communication cloud 130, in this example, is provided by cellular tower 132, which is provided by cellular provider "B." Thus, in the FIG. 1 scenario, for train 105 to access wireless communication clouds 110, 120 and 130, it would have to be equipped with the appropriate electronics and antennas to communicate with cellular providers "A" and "B," and also with the local area wireless network of cloud 120.

Figure 2:
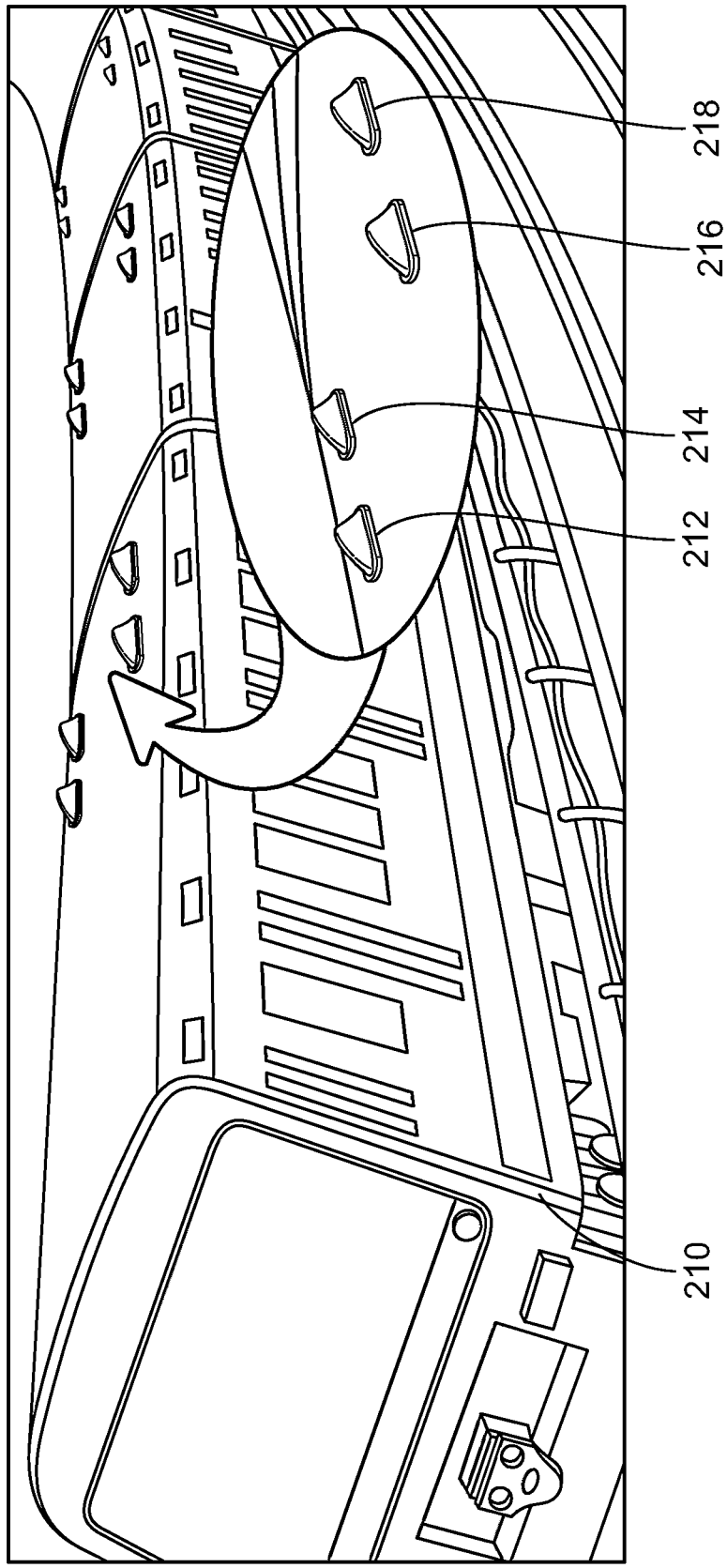
FIG. 2 illustrates an existing system of multiple single frequency rooftop antennas mounted on a railcar.

One approach to communicating with multiple cellular providers, e.g., providers "A" and "B," and with the local area wireless network would be to attach a corresponding antenna to train 105 for each cellular provider, and another antenna for the local area wireless network. Such an approach could be configured to look like FIG. 2 that illustrates a railcar 210 with multiple single frequency individually mounted antennas 212, 214, 216 and 218. This approach requires the undesirable effect of requiring multiple penetrations of the roof skin of railcar 210 for the mounting and feed through of the associated signal cabling.

Figure 3:
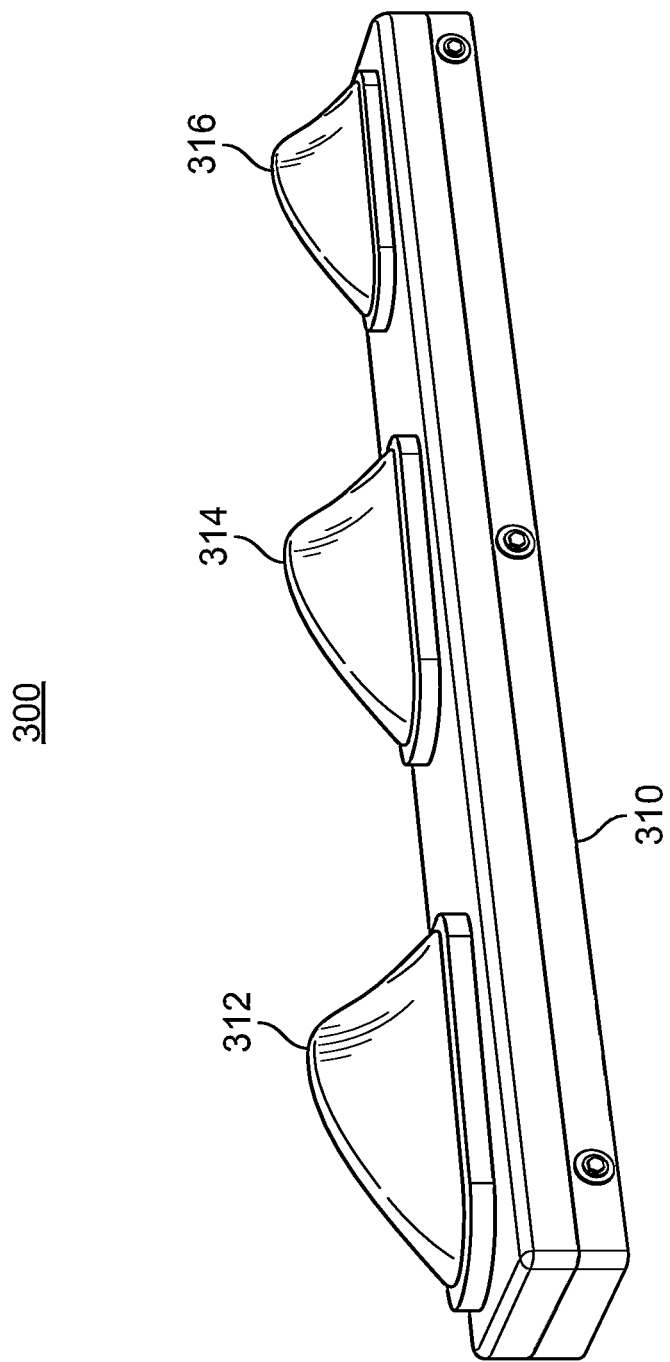
FIG. 3 illustrates a single rooftop enclosure with multiple separate antenna elements, according to an embodiment of the present invention.

FIG. 3 illustrates system 300 of a multi-frequency rail car antenna array, according to an embodiment. System 300 includes array 310 with three individual antennas that includes antenna 312, antenna 314, and antenna 316. In this embodiment antennas 312 and 314 contain broadband elements to communicate over multiple cellular frequencies. Antenna 314 also contains a broadband element to receive GPS signals. Antenna 316 contains elements to communicate over a local area wireless network. However, system 300 is only configured to communicate with a single provider at a time. While antennas 312 and 314 are multi-frequency and able to communicate with multiple cellular providers, system 300 can only communicate with a single provider at a time as the broadband elements are configured for a particular provider's set of frequencies for data communication sessions.

Figure 4:
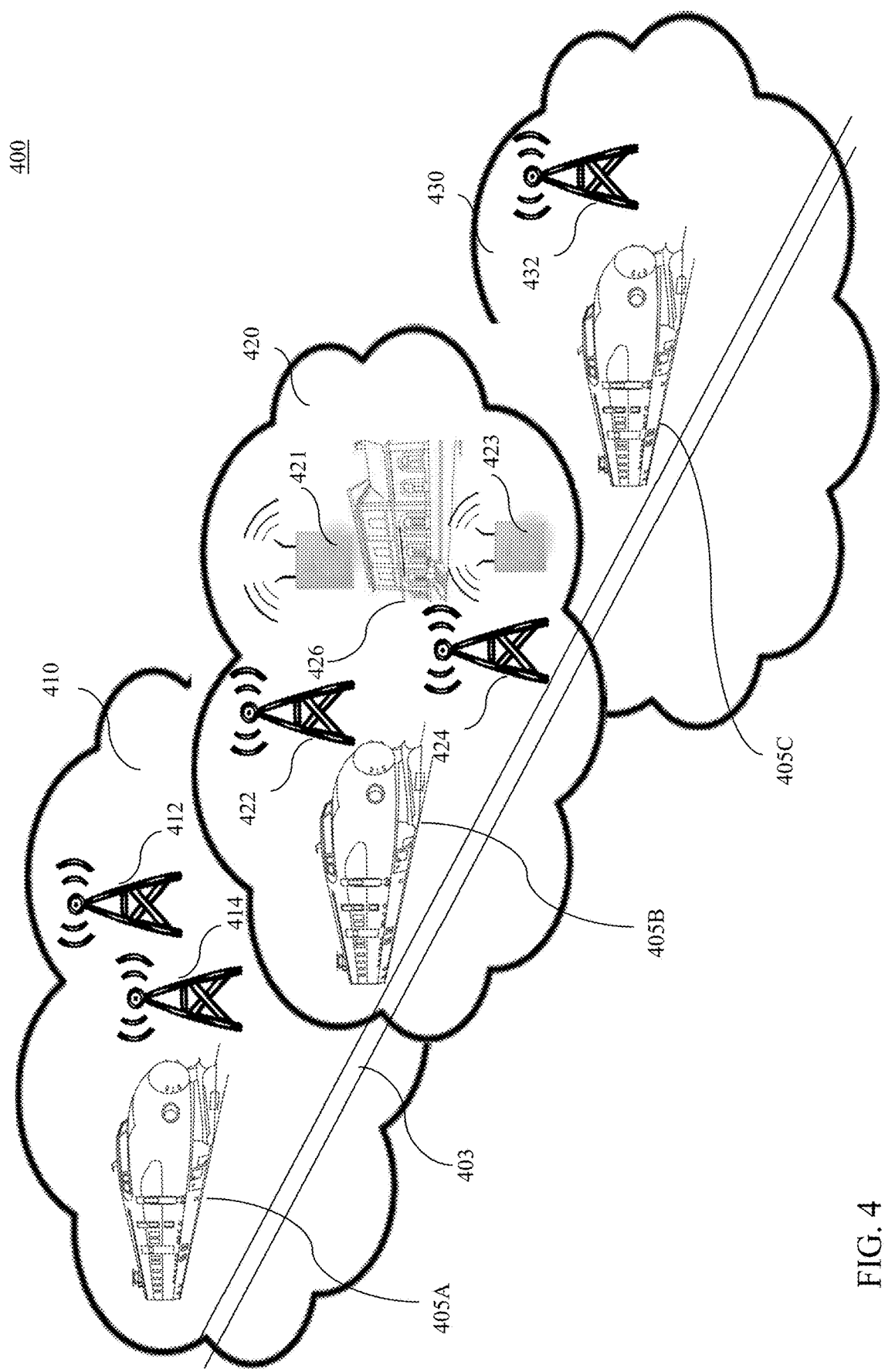
FIG. 4 illustrates multiple cellular carriers and wireless access points in a single communication cloud, according to an embodiment of the present invention.

FIG. 4 illustrates scenario 400 in which multiple carriers and types of wireless communications are present within a single communication cloud, in an embodiment. For example, train 405 on track 403, shown in position 405A is within communication cloud 410. Within communication cloud 410 there are shown two cellular towers, 412 and 414, where tower 412 is operated by cellular provider "A" and tower 414 is operated by cellular provider "B." In an embodiment, while in communication cloud 410, train 405A can establish a cellular data communications link with tower 412 utilizing the frequencies allocated to cellular provider "A." Train 405A could also establish a second concurrent cellular data communications link with tower 414 utilizing the frequencies allocated to cellular provider "B." The establishment of two independent links theoretically provides train 405A with twice the data throughput of a single cellular connection. Further, train 405A could establish two, or more, independent links with both towers 412 and 414, thus providing a higher data throughput over a multiple cellular connections.

In an embodiment, train 405B is within communication cloud 420 and has access to cellular towers 422 and 424, and also has access to local area wireless networks through access points 421 and 423. Access points 421 and 423 could be located in train station 426, or anywhere along track 403 to provide access to train 405. Train 405B could establish data communication links through either of cellular towers 422 and 424 and also through access point 421 and 423. The choice of which links to establish can be a combination of desired throughput and other factors such as cost. For example, if the entity that owns train 405 also owns access points 421 and 423, then from a cost standpoint it may be advantageous to establish multiple links using the local are a wireless networks through access points 421 and 423. However, if access points 421 and 423 cannot provide the desired level of data throughput, then train 405B could also concurrently access cellular towers 422 and 424 to supplement the desired data throughput.

In an embodiment, train 405C is within communication cloud 430 and only has access to cellular tower 432. To accommodate higher data rate communications in train 405C it may be necessary to establish multiple independent communication links to tower 432. Therefore, rather than establishing multiple communication links to different carriers as was described in communication cloud 410, it is also possible to establish multiple independent communication links with a single carrier. Of course, if communication cloud 430 had multiple carriers, then train 405C could establish communication links to multiple carriers in addition to maintaining multiple links to any single carrier.

Figure 5A:
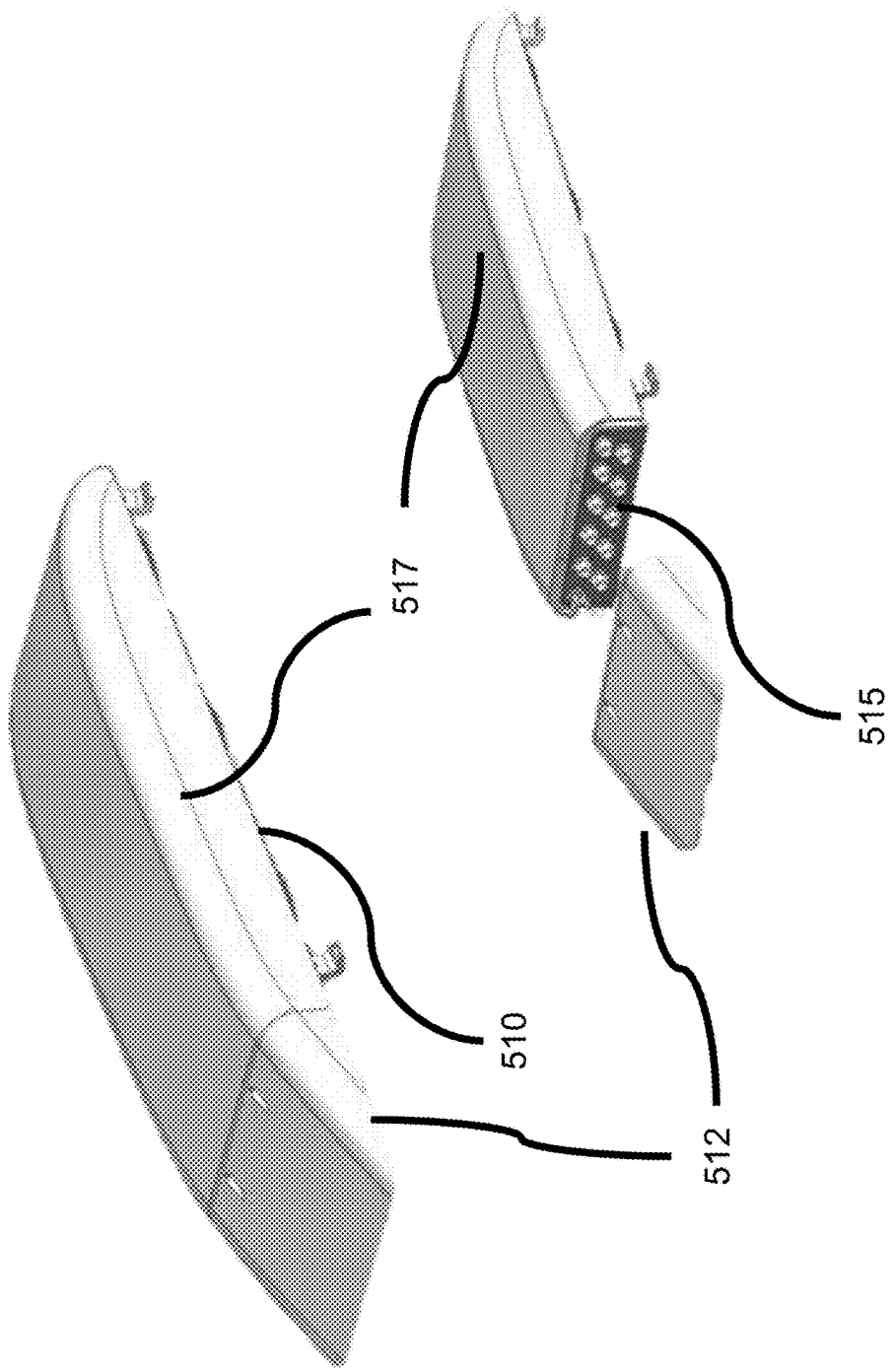
FIGS. 5A and 5B illustrate a single enclosed antenna array with multiple broadband elements with a detachable end cover exposing multiple antenna connectors, according to an embodiment of the present invention.

FIG. 5A illustrates a multi-frequency rail car antenna array system 500A, according to an embodiment. Antenna array system 500A includes the antenna array 510, antenna connector cover 512, antenna connectors 515, and radome cover 517. FIG. 3 discussed an array 310 with three individual antenna elements. System 500 expands the concept illustrated in FIG. 3 to include 11 antenna elements. Thus, system 500 can support up to four (4) concurrent Fourth Generation (4G) cellular data communication sessions using multiple input multiple output (MIMO) transmission modes concurrently with up to two 3×3 MIMO unlicensed local area wireless network connections.

As background, the first generation of cellular communications was through the use of analog systems with very limited capacity. The second generation of cellular system, e.g., "2G," was based on digital technology to increase capacity and reduce costs. In the early 1980s the International Telecommunication Union (ITU), a specialized agency of the United Nations responsible for information and communication technologies and the coordination of shared global use of the radio spectrum, developed a set of "third generation," "3G," specifications and standards known as the IMT-2000 standards for voice and data communications.

Demand for data access by mobile devices continued to increase and in March 2008, the ITU released a set of requirements for the 4G standards of cellular communications, setting peak speed requirements at 100 MB/s for high mobility communication, e.g., from moving vehicles, and at 1 Gbit/s for low mobility communication, e.g., pedestrians and stationary users (ITU global standard for international mobile telecommunications 'IMT-Advanced', Circular letter, ITU-R March 2008).

Within the 4G standards there are a number of defined transmission modes that provide increasingly higher throughput rates. However, the available transmission modes are dependent upon each cellular provider as not all providers support all of the transmission modes. As stated above, antenna array system 500 supports up to four concurrent MIMO communication sessions including the transmission modes described in Table 1 below. See the table below for a summary description of the typical modes supported under release 9.3 of the 3GPP speculations (3GPP is the $3^{rd}$ Generation Partnership Project that unites six telecommunications standards development organizations that defines standards for the cellular telecommunications network technologies.):

TABLE 1

(See, 3GPP TS 36.213 V9.3.0 (2010 October.)

| Transmission Mode | Description | # of Antennas |
|---|---|---|
| Mode 1 | Single Transmit Antenna, SIMO | 1 |
| Mode 2 | Open Loop Transmit Diversity | 2 or 4 |
| Mode 3 | Open Loop Spatial Multiplexing SU-MIMO | 2 or 4 |
| Mode 4 | Closed Loop Spatial Multiplexing SU-MIMO | 2 or 4 |
| Mode 5 | Closed-Loop Multi-User MIMO | 2 or 4 |
| Mode 6 | Transmit Diversity or Closed Loop Spatial Multiplexing | 2 or 4 |
| Mode 7 | Single Layer Beamforming | Virtual |
| Mode 8 | Dual Layer Beamforming, SU-MIMO or MU-MIMO | Virtual |

Table 1

Unlicensed local area wireless networks, which can also be referred to as "WiFi" networks, do not require a licensed provider where specific frequencies are owned and controlled by a particular carrier/provider. A WiFi network typically is any wireless local area network that is based on the IEEE 802.11 standards. Like the transmission mode standards discussed above for cellular communications, WiFi 802.11 standards cover a variety of modes. For example, the IEEE 802.11n specification supports the following MIMO modes, where the mode is described as TxR:S (T: number of transmit radio chains, R: number of receive radio chains, and S: number of spatial data streams): As stated above, antenna array system 500 supports up to 2 concurrent 3×3:3 communications, as described in Table 2 below.

TABLE 2

(See, IEEE Standard for Information technology, Amendment 5: Enhancements for Higher Throughput (2009).)

| Mode | Maximum Data Rate | # of Antennas |
|---|---|---|
| 1 × 1:1 | 150 Mbps transmitting and receiving | 1 transmit, 1 receive |
| 1 × 2:2 | 150 Mbps transmitting, 300 Mbps receiving | 2 transmit, 2 receive |
| 2 × 2:2 | 300 Mbps transmitting and receiving | 2 transmit, 2 receive |
| 2 × 3:2 | 300 Mbps transmitting and receiving | 2 transmit, 3 receive |
| 3 × 3:2 | 300 Mbps transmitting and receiving | 3 transmit, 3 receive |
| 3 × 3:3 | 450 Mbps transmitting and receiving | 3 transmit, 3 receive |

Figure 5B:
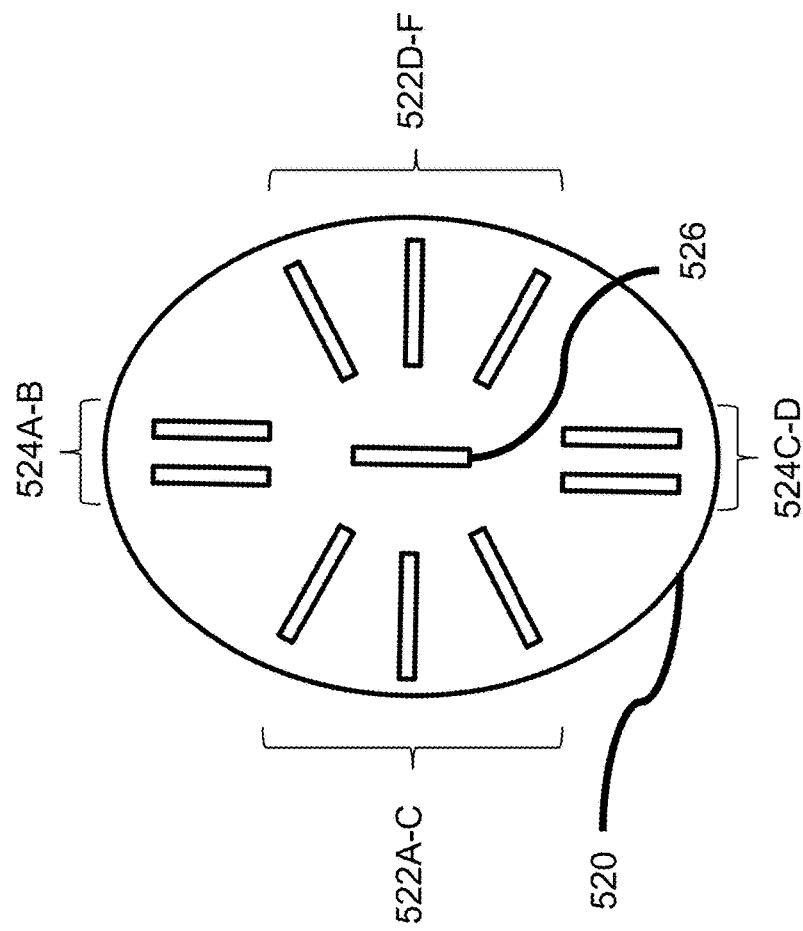

FIG. 5B illustrates an antenna array 500B of the multi-frequency rail car antenna array system 500A, according to an embodiment. Antenna array system 500B includes antenna array 520 which contains three sets of broadband elements, 522, 524 and 526. Broadband elements 522 A-F contain 6 broadband elements in support of up to two concurrent 3×3 MIMO communication sessions over unlicensed local area wireless network connections. Broadband elements 524 A-D contain 4 broadband elements in support of up to four concurrent 4G cellular data communication sessions using multiple input multiple output (MIMO) transmission modes. And, broadband element 526 is for receiving GPS signals. The placement of broadband elements 522, 524 and 526 are for illustration purposes and are not restricted to the placements shown in FIG. 5B.

The broadband elements 522 and 524 are positioned such that there is a minimum isolation of 15 dB at frequencies less than 1 GHz and greater than 20 dB for frequencies greater than 1 GHz. In an embodiment each radiating element is connected to one of the 10 sealed N-connectors 515 as shown in FIG. 5A. GPS broadband element 526 is also connected to an additional sealed N-connector 515.

In an embodiment, broadband elements 522 for communications over unlicensed local area wireless networks cover 2400-2485 MHz and 4900-5935 MHz with a minimum of 15 dB isolation and a VSWR of 2:1. In an embodiment, broadband elements 524 for cellular data communications cover 698-960 MHz, 1710-2170 MHz, 2400-2700 MHz, with a minimum of 15 dB isolation and a VSWR of 2:1. Broadband element 526, in an embodiment, includes an embedded LNA with a 30 dB gain and a VSWR of 2:1. In an embodiment, broadband elements 522, 524 and 526 are DC-grounded.

Signals received and transmitted through antenna array 500B are controlled by a separate controller. Such a controller can also be referred to as an access point or router. It is this controller's function to allocate communications between the cellular elements and between the local area wireless networks. For example, in an embodiment, the controller could give priority to communications over the local area wireless networks and therefore would limit, or possibly eliminate communications using the cellular broadband elements. This situation could occur when the rail car with antenna array 500B has access to access points that are owned and operated by the rail car company. If the entire bandwidth of the local area wireless networks is being used, then the controller could revert to adding additional capacity through one or more cellular data communication sessions using the cellular broadband elements.

Figure 6A:
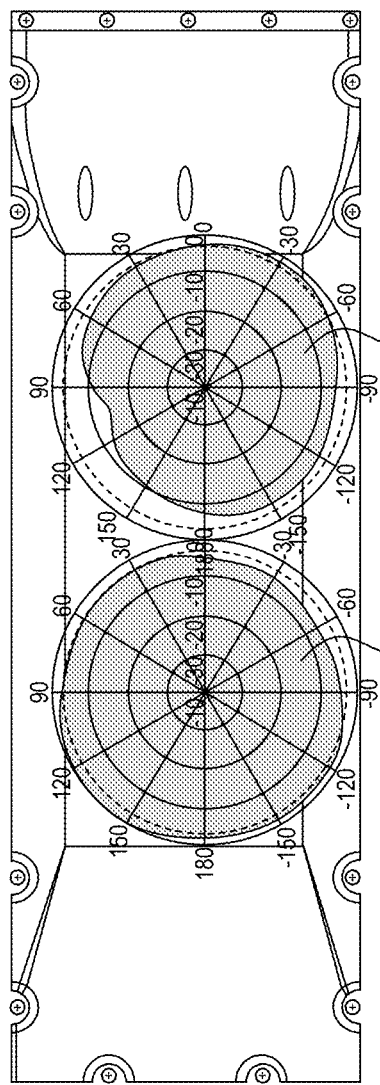
FIGS. 6A, 6B, 6C and 6D illustrate antenna patterns for cellular and wireless antenna elements, according to an embodiment of the present invention.
Figure 6B:
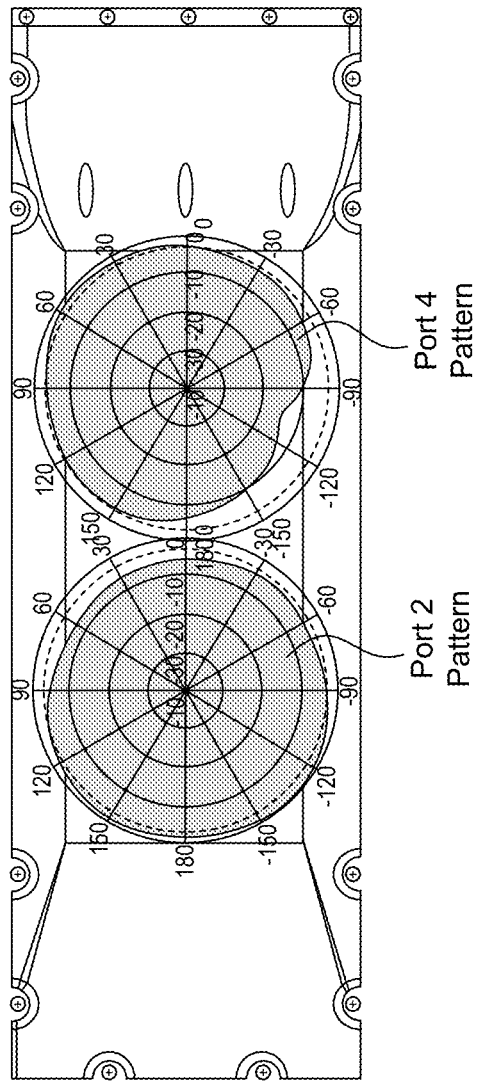

FIGS. 6A and 6B illustrate antenna H-plane patterns at 700 MHz for four concurrent cellular communication sessions using broadband elements 524 shown in FIG. 5B. FIG. 6A shows the patterns associated with ports 1 and 3, e.g., elements 524A and 524C. FIG. 6B shows the patterns associated with ports 2 and 4, e.g., elements 524B and 524D.

Figure 6C:
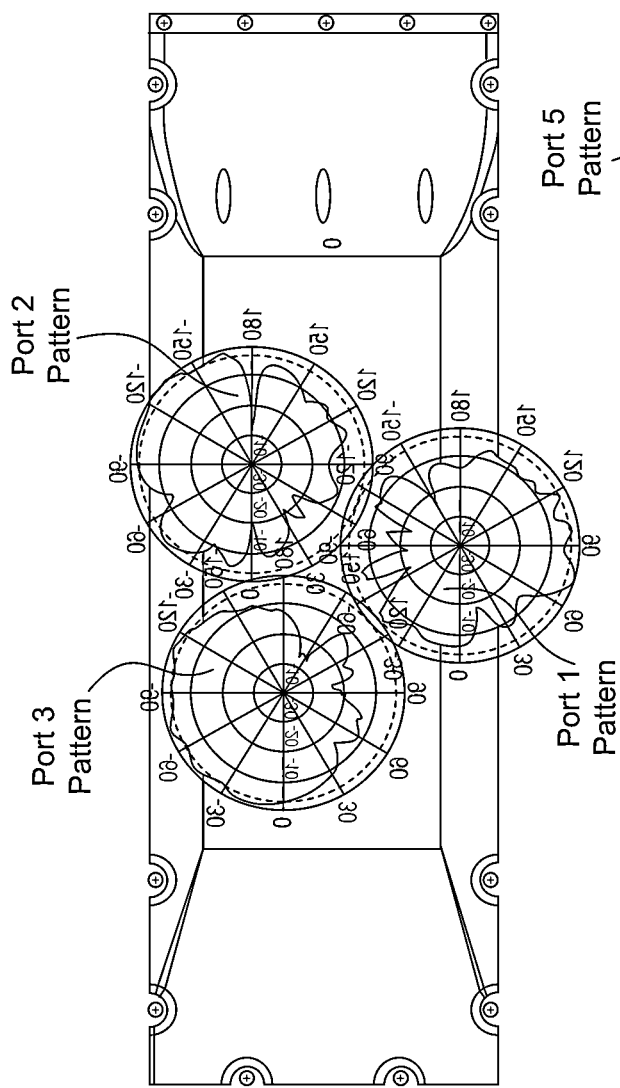
Figure 6D:
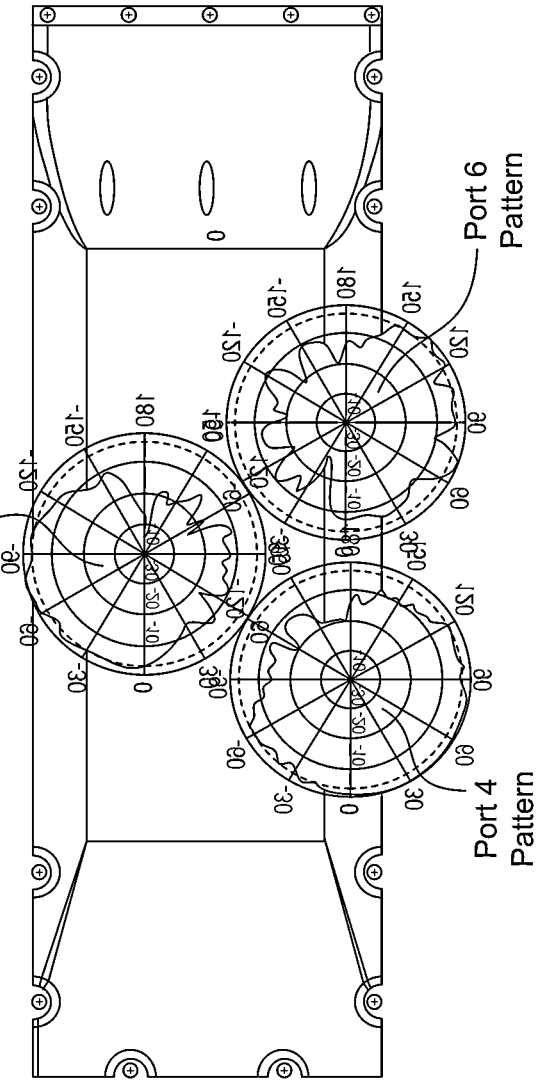

FIGS. 6C and 6D illustrate antenna H-plane patterns at 5.5 GHz for six broadband elements, e.g., 522A-F, in support of up to two concurrent 3×3 MIMO communication sessions over unlicensed local area wireless network connections. FIG. 6C shows the patterns associated with ports 1, 2 and 3, e.g., elements 522A, 522C and 522E. FIG. 6D shows the patterns associated with ports 4, 5 and 6, e.g., elements 522B, 522D and 522F.

Figure 7:
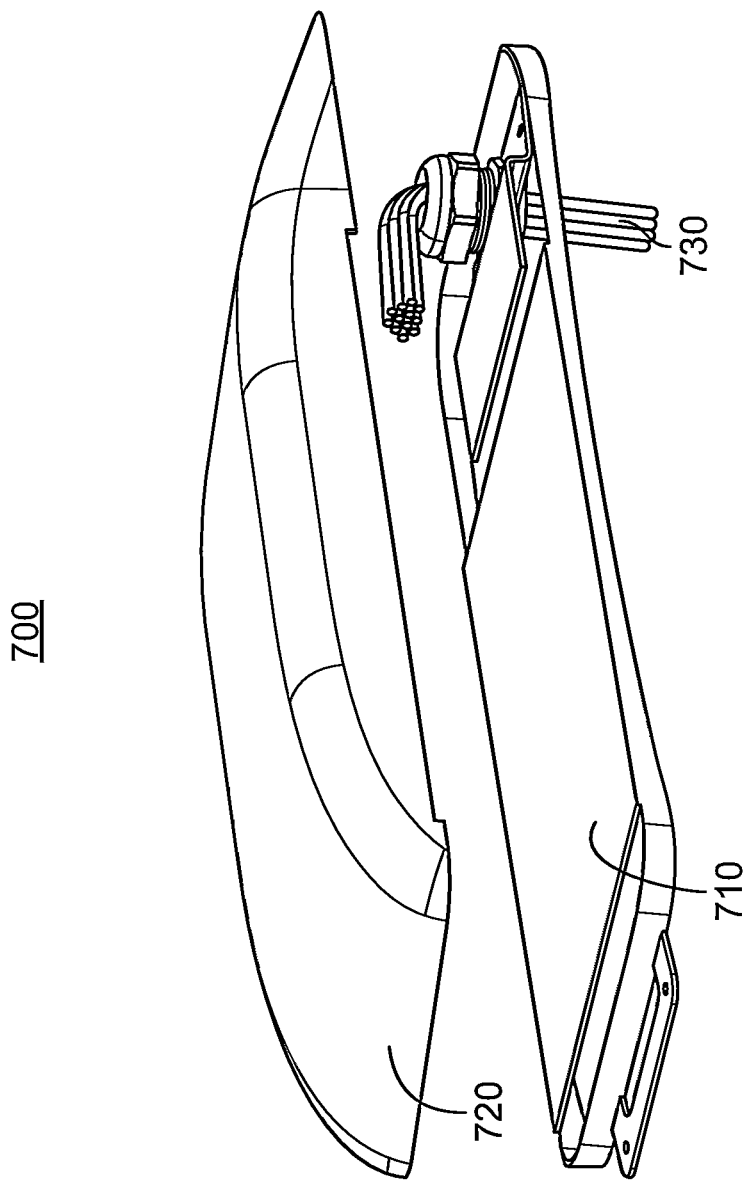
FIG. 7 illustrates a single enclosed antenna array with a detachable skirt, according to an embodiment of the present invention.

FIG. 7 illustrates a multi-frequency rail car antenna array system 700, according to an embodiment. Antenna array system 700 includes the antenna adapter skirt 710, radome cover 720 and RF antenna cabling harness 730. Antenna adapter skirt 710 is coupled to an antenna array, not shown, that includes the broadband elements as discussed in FIG. 5B. In addition, antenna adapter skirt 710 adapts the antenna array to the mounting profile for a specific rail car and mounting location. Different adapter skirts enable the same antenna array to be adapted to different rail car models and mounting scenarios.

Radome cover 720 is a single radome cover that encloses the broadband elements for cellular, local area wireless networks, and GPS communications. In an embodiment, RF cabling harness 730 provides a detachable interface to the antenna array. RF cabling harness 730 also incorporates a sealing gland to maintain a single watertight entry through the roof of the rail car. Further, given the restrictions on the heights of rail cars, antenna array system 700 is designed to have a maximum height of 3.5 inches and a maximum width of 10 inches.

In an embodiment, multi-frequency rail car antenna array system 700 is compliant with the environment specifications of Standard EN50155 "Railways Applications Electronic Equipment Used on Rolling Stock."

Figure 8:
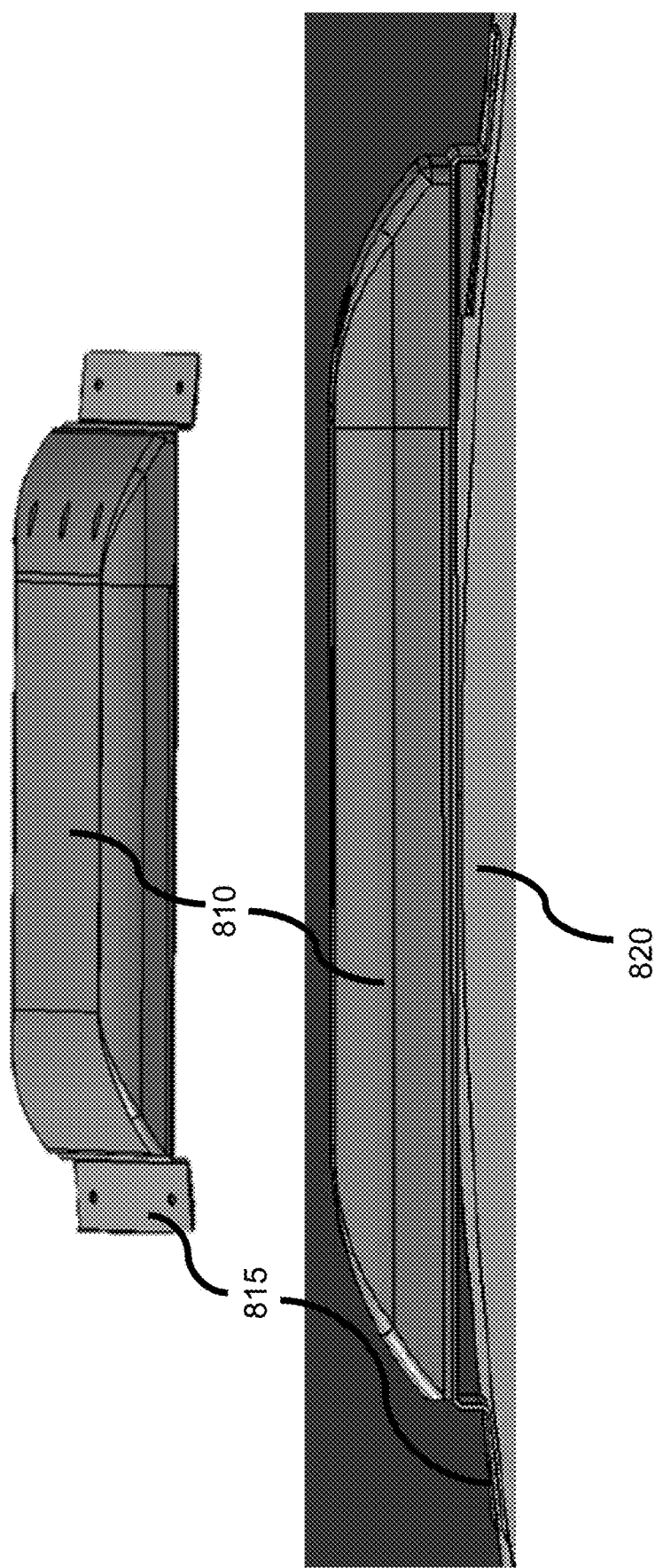
FIG. 8 illustrates a single enclosed antenna array mounted to the roof of a railcar, according to an embodiment of the present invention.

FIG. 8 is an illustration of a multi-frequency rail car antenna array system 800, according to an embodiment. Antenna array system 810 is shown connected to antenna adapter skirt 815 that is mounted to the roof of rail car 820. In an embodiment antenna adapter skirt 815 can be curved to match the contours of rail car 820. In other embodiments, antenna adapter skirt 815 can be flat or any other angle that allows mounting to rail car 820.

Figure 9:
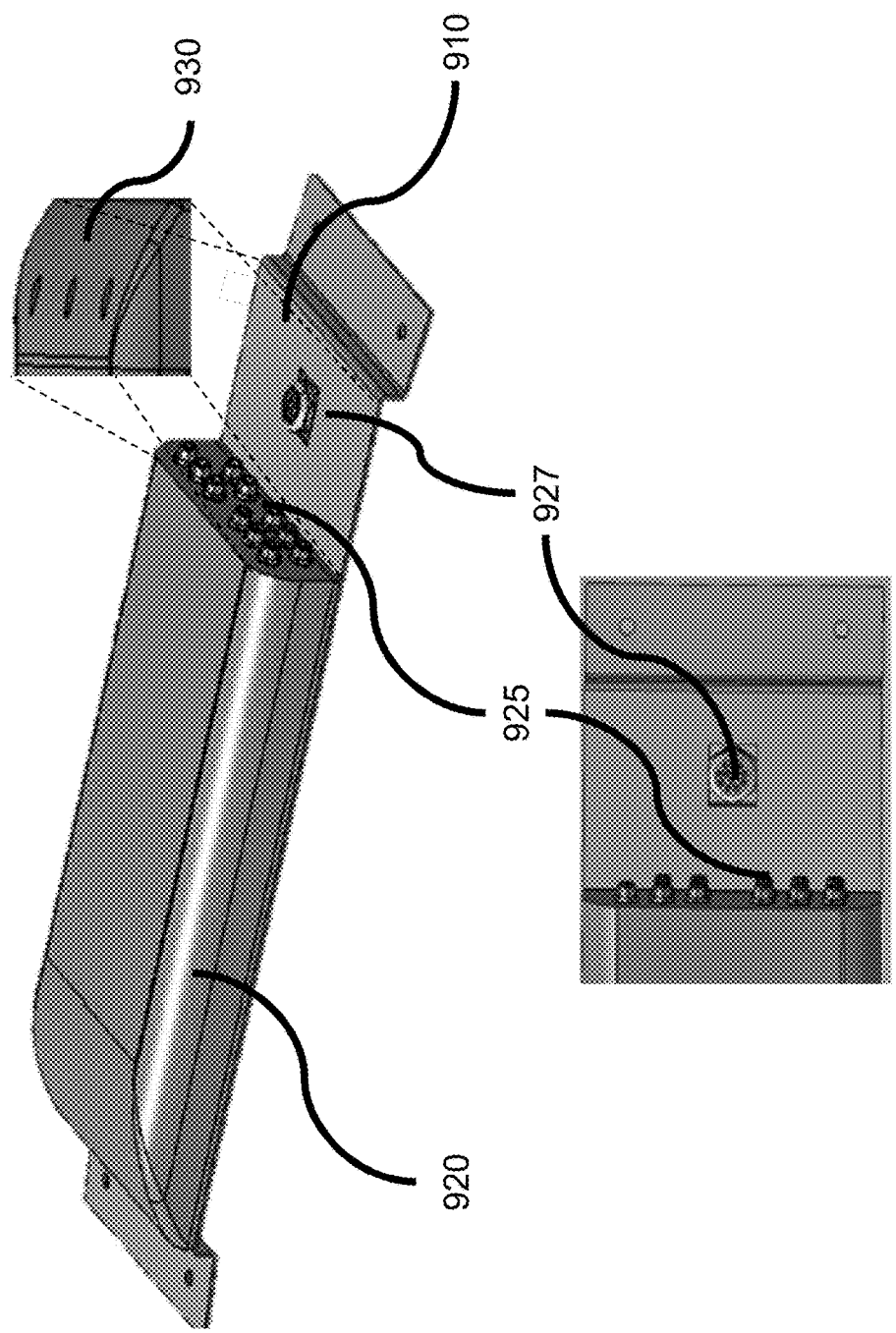
FIG. 9 illustrates a single enclosed antenna array with a detachable end cover exposing multiple antenna connectors, and a cable connector, according to an embodiment of the present invention.

FIG. 9 illustrates a multi-frequency rail car antenna array system 900, according to an embodiment. Antenna array system 900 contains an antenna adapter skirt 910, a radome cover 920, antenna connectors 925, cable harness connector 927, and cable cover 930. As mentioned above, an antenna array that includes broadband elements for data communications utilizing cellular and wide area wireless networks is attached. Further, antenna adapter skirt 910 adapts the antenna array to the mounting car of a specific type of rail car. Interconnecting cables, not shown, are used to connect cable harness connector 927 to antenna connectors 925. Cable cover 930 is shown as being removed from antenna array antenna adapter skirt 910 for accessing the interconnect cabling. During operation cable cover 930 is secured to adapter skirt 927 as shown by the dashed lines.

Embodiments described herein provide methods and apparatus for establishing communication session utilizing a multiple-frequency antenna array. The summary and abstract sections may set forth one or more but not all exemplary embodiments of the present invention as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A multiple-frequency antenna array system, comprising:
    a first plurality of broadband elements configured to support a plurality of cellular communication sessions, a first set of broadband elements from among the first plurality of broadband elements being configured to support a first cellular communication session from among the plurality of cellular communication sessions over a first cellular network associated with a first cellular provider and a second set of broadband elements from among the first plurality of broadband elements configured to support a second cellular communication session from among the plurality of cellular communication sessions over a second cellular network associated with a second cellular provider, the first set of broadband elements and the second set of broadband elements including different broadband elements from among the first plurality of broadband elements that are configured to concurrently support the first cellular communication session and the second cellular communication session; and
    a second plurality of broadband elements configured to establish a first local area wireless network communication session and a concurrent second local area wireless network communication session,
    wherein the first plurality of broadband elements and the second plurality of broadband elements are arranged onto a plane,
    wherein the first set of broadband elements is situated onto the plane between a third set of broadband elements from among the second plurality of broadband elements and a fourth set of broadband elements from among the second plurality of broadband elements, and
    wherein the second set of broadband elements is situated onto the plane between the third set of broadband elements and the fourth set of broadband elements.

2. The multiple-frequency antenna array system of claim 1, wherein the first set of broadband elements is configured to support the first cellular communication session using a first multiple input multiple output (MIMO) mode, and
    wherein the second set of broadband elements is configured to support the second cellular communication session using a second MIMO mode.

3. The multiple-frequency antenna array system of claim 2, wherein the first MIMO mode or the second MIMO mode are selected from a plurality of MIMO modes as defined in a communications standard.

4. The multiple-frequency antenna array system of claim 3, wherein the communications standard comprises:
    a version of a $3^{rd}$ Generation Partnership Project (3GPP) communications standard.

5. The multiple-frequency antenna array system of claim 1, wherein the second plurality of broadband elements is configured to support a multiple input multiple output (MIMO) mode.

6. The multiple-frequency antenna array system of claim 5, wherein the MIMO mode is selected from a plurality of MIMO modes as defined in a communications standard.

7. The multiple-frequency antenna array system of claim 6, wherein the communications standard comprises:
    a version of an Institute of Electrical and Electronics Engineers (IEEE) 802 communications standard.

8. The multiple-frequency antenna array system of claim 1, further comprising:
    a controller configured to allocate communications between the first plurality of broadband elements and the second plurality of broadband elements based upon priorities associated with the first cellular communication session, the second cellular communication session, the first local area wireless network communication session, and the second local area wireless network communication session.

9. The multiple-frequency antenna array system of claim 8, wherein the controller is further configured to allocate the communications to the first set of first broadband elements and the second set of broadband elements in response to a bandwidth supported by the second plurality of broadband elements being entirely utilized.

10. The multiple-frequency antenna array system of claim 1, wherein the second set of broadband elements is situated onto the plane opposite the first set of broadband elements.

11. The multiple-frequency antenna array system of claim 10, further comprising:
    at least one third broadband element, situated between the first plurality of broadband elements and the second plurality of broadband elements, configured to receive a global positioning signal.

12. The multiple-frequency antenna array system of claim 1, further comprising:
    at least one third broadband element situated between the first plurality of broadband elements and the second plurality of broadband elements, the first plurality of broadband elements and the second plurality of broadband elements being situated radially outward from the at least one third broadband element.

13. A multiple-frequency antenna array system for providing communications to a vehicle, the multiple-frequency antenna array system comprising:
- a first set of broadband elements from among a first plurality of broadband elements configured to support a first cellular communication session over a first cellular network associated with a first cellular provider;
- a second set of broadband elements, different from the first set of broadband elements, from among the first plurality of broadband elements configured to support a second cellular communication session over a second cellular network associated with a second cellular provider, the first set of broadband elements and the second set of broadband elements being configured to concurrently support the first cellular communication session and the second cellular communication session,
- wherein the first plurality of broadband elements and a second plurality of broadband elements are arranged onto a plane,
- wherein the first set of broadband elements is situated onto the plane between a third set of broadband elements from among the second plurality of broadband elements and a fourth set of broadband elements from among the second plurality of broadband elements, and
- wherein the second set of broadband elements is situated onto the plane between the third set of broadband elements and the fourth set of broadband elements;
- a radome cover configured to enclose the first plurality of broadband elements and the second plurality of broadband elements; and
- an antenna adapter skirt configured to adapt the first plurality of broadband elements and the second plurality of broadband elements to a mounting profile for a mounting location on the vehicle.

14. The multiple-frequency antenna array system of claim 13, wherein the vehicle comprises: a railcar.

15. The multiple-frequency antenna array system of claim 13, wherein the first set of broadband elements is configured to support the first cellular communication session using a first multiple input multiple output (MIMO) mode, and
   wherein the second set of broadband elements is configured to support the second cellular communication session using a second MIMO mode.

16. The multiple-frequency antenna array system of claim 13, wherein the second set of broadband elements is configured to support a multiple input multiple output (MIMO) mode.

17. The multiple-frequency antenna array system of claim 13, further comprising:
- a controller configured to allocate communications between the first set of broadband elements and the second set of broadband elements based upon priorities associated with the first cellular communication session and the second cellular communication session.

18. The multiple-frequency antenna array system of claim 17, wherein the controller is further configured to allocate the communications to the first set of broadband elements in response to a bandwidth supported by the second set of broadband elements being entirely utilized.

19. A method for providing communications, the method comprising:
- establishing a first cellular communication session over a first cellular network associated with a first cellular provider using a first set of broadband elements from among a first plurality of broadband elements;
- establishing a second cellular communication session over a second cellular network associated with a second cellular provider using a second set of broadband elements, different from the first set of broadband elements, from among the first plurality of broadband elements, the first cellular communication session and the second cellular communication session being concurrently supported by the first set of broadband elements and the second set of broadband elements; and
- establishing a first local area wireless network communication session and a concurrent second local area wireless network communication session using a second plurality of broadband elements,
- wherein the first plurality of broadband elements and the second plurality of broadband elements are arranged onto a plane,
- wherein the first set of broadband elements is situated onto the plane between a third set of broadband elements from among the second plurality of broadband elements and a fourth set of broadband elements from among the second plurality of broadband elements, and
- wherein the second set of broadband elements is situated onto the plane between the third set of broadband elements and the fourth set of broadband elements.

20. The method of claim 19, wherein the establishing the first cellular communication comprises establishing the first cellular communication using a first multiple input multiple output (MIMO) mode, and wherein the establishing the second cellular communication comprises establishing the second cellular communication using a second MIMO mode.

21. The method of claim 19, wherein the establishing the first local area wireless network communication session and the concurrent second local area wireless network communication session comprises:
- establishing the first local area wireless network communication session and the concurrent second local area wireless network communication session using a first multiple input multiple output (MIMO) mode and a second MIMO mode, respectively.

22. The method of claim 19, further comprising:
- allocating communications between the first set of broadband elements and the second set of broadband elements based upon priorities associated with the first cellular communication session, the second cellular communication session, the first local area wireless network communication session, and the second local area wireless network communication session.

23. The method of claim 22, wherein the allocating comprises:
- allocating the communications to the first set of broadband elements and the second set of broadband elements in response to a bandwidth supported by the second plurality of broadband elements being entirely utilized.

* * * * *